Patented Oct. 19, 1948

2,451,642

UNITED STATES PATENT OFFICE 2,451,642

VISCOUS MINERAL OIL COMPOSITIONS

Roger W. Watson, Chicago, Ill., assignor to Standard Oil Company, Chicago, Ill., a corporation of Indiana No Drawing. Application October 23, 1944, Serial No. 560,049

1 Claim. (Cl. 252—50)

This invention relates to hydrocarbon oil compositions and particularly to hydrocarbon oil compositions inhibited against the deleterious effects of metal catalysts, particularly iron. The invention is more particularly related to the stabilization of viscous mineral oils such as turbine oils, transformer oils and internal combustion engine lubricants by the use of certain types of additives which effectively inhibit the deleterious oxidation of such oils, especially in the presence of metal catalysts such as iron.

Hyrocarbon oils such as petroleum oils which have been subjected to relatively drastic chemical treatment such as by sulfuric acid treatment and/or extraction with selective solvents such as, for example, phenol, furfural, Chlorex and the like, are susceptible to oxidative deterioration during use and/or storage, particularly when such oils are used or stored in the presence of metal salts such as iron which accelerates the oxidation of such oils. Such oxidative deterioration results in the formation of acidic bodies and/or sludge-forming bodies and/or color-forming bodies which obviously are highly undesirable.

An object of the present invention is to provide a hydrocarbon oil composition which is resistant to oxidative deterioration, particularly in the presence of metal catalysts such as iron. Another object of the present invention is to provide a hydrocarbon oil composition inhibited against the formation of acidic bodies and/or color-forming bodies and/or sludge-forming bodies during use or storage, particularly in the presence of metal catalysts which accelerate the oxidative deterioration of such oils. Another object of the invention is to provide a method of inhibiting the oxidative deterioration of hydrocarbon oils which are normally susceptible to such deterioration, particularly in the presence of oxidation accelerating metal catalysts.

I have discovered that refined hydrocarbon oils, for example mineral oils, can be substantially inhibited against oxidative deterioration in the presence of metal catalysts by incorporating in such oils unsubstituted or alkyl substituted phenylene diamines. It has been found that from about 0.001% to about 0.5% and preferably from about 0.01% to about 0.2% of these addition agents in refined hydrocarbon oils which are susceptible to oxidative deterioration, particularly in the presence of metal catalysts such as iron, effectively inhibit such oxidative deterioration. Compounds of this class have the general formula

in which R is hydrogen or an aliphatic radical, cyclo-aliphatic radical, or an aralkyl radical. This general class of compounds includes the unsubstituted ortho-, meta-, and para-phenylene diamines and the alkyl or aralkyl substituted meta-, ortho- and para-phenylene diamines.

The following are illustrative of the specific types of compounds which fall within the above general class of compounds suitable for the herein-described use:

N-dimethyl-phenylene diamine
N-dibutyl-phenylene diamine
Tetramethyl-phenylene diamine
N-dimethyl-N'- para-isopropyl-benzyl-phenylene diamine
N-dioctyl-paraphenylene diamine
Lauryl-metaphenylene diamine
Tetra-hexyl-phenylene diamine
NN'-dibenzyl paraphenylene diamine
Ortho phenylene diamine
Metaphenylene diamine
Paraphenylene diamine
N-dimethyl,N'-diisobutyl-paraphenylene diamine
N-octa decyl-paraphenylene diamine
N,N'-dicyclohexyl-phenylene diamine
N,N'-dimethyl-metaphenylene diamine
N,N'-dimethyl-ortho-phenylene diamine
Diisopropyl-paraphenylene diamine
N,N'-tetrabutyl-paraphenylene diamine While compounds of the herein-described class are effective in inhibiting the oxidative deterioration of hydrocarbon oils in the presence of metal catalysts, particularly iron, it is not to be implied that all are equally effective since the effectiveness can vary with the type of oil and the conditions of use.

The present invention is applicable to any type of viscous hydrocarbon oil. By "viscous" hydrocarbon oil we mean an oil having a Saybolt Universal viscosity at 100° F. of at least about 60-70 seconds.

The effectiveness of the herein-described compounds in inhibiting the oxidative deterioration of hydrocarbon oils in the presence of a metal catalyst such as iron can be determined by the following test:

Ten grams of the oil to be tested containing 0.1 gram of finely ground iron catalyst is placed in a container having a tapered ground glass joint into which is fitted a gas bubbling tube having a ground glass joint which fits into the ground joint of the container. Oxygen is bubbled through the oil at a rate of 1 liter of gas per hour for a period of 24 hours at a temperature of 320° F. At the end of this period the oil is removed and color, acidity and sludge determinations are made. The effectiveness of the class of phenylene diamines disclosed herein in inhibiting the deleterious effect of metal catalysts, particularly iron, on hydrocarbon oil is shown by the following data obtained in the foregoing test:

| Oil | Catalyst | Color NPA | Mg. KOH per gr. oil | Sludge |
|---|---|---|---|---|
| A. Control (M. C. SAE 20 base stock) | 0.1 g. Powdered Fe | Black | 11.8 | + |
| B. Control+0.1% N-dimethyl-paraphenylene diamine | do | 6 | 0.3 | 0 |
| C. Control+0.1% N,N'-dibenzyl-paraphenylene diamine | do | 4 | 0.2 | 0 |
| D. Control+0.1% N-dibutyl-paraphenylene diamine | do | 5 | 0.5 | 0 |
| E. Control+0.1% N,N'-tetramethyl-paraphenylene diamine | do | Light | 0.3 | 0 |
| F. Control+0.1% ortho phenylene diamine | do | Dark | 0.6 | 0 |
| G. Control+0.1% metaphenylene diamine | do | Light | 0.2 | 0 |
| H. Control+0.1% paraphenylene diamine | do | do | 0.3 | 0 |

In the above table the notation "+" in the column headed "sludge" denotes that sludge was present in the oil while the notation of "0" denotes that no sludge was present in the oil.

It is evident from the above data that the unsubstituted phenylene diamines and the alkyl and aralkyl-substituted phenylene diamines effectively inhibit the oxidative deterioration of hydrocarbon oils in the presence of metal catalysts.

While I have described my invention by reference to certain specific embodiments thereof, and by certain specific examples, I do not intend to limit the invention to these specific embodiments and examples except in so far as the same are defined by the following claim.

I claim:

A stable normally liquid viscous mineral oil composition comprising a viscous mineral oil normally susceptible to oxidative deterioration in the presence of metal and from about 0.001% to about 0.5% of N,N'-dibenzyl-paraphenylene diamine.

ROGER W. WATSON.

REFERENCES CITED

The following references are of record in the file of this patent:

UNITED STATES PATENTS

| Number | Name | Date |
|---|---|---|
| 2,369,705 | Woodward | Feb. 20, 1945 |
| 2,354,252 | Fraser | July 25, 1944 |
| 2,351,384 | Woods | June 13, 1944 |
| 2,323,948 | Bramer | July 13, 1943 |
| 2,273,862 | Hamilton | Feb. 24, 1942 |
| 2,266,576 | Tuley | Dec. 16, 1941 |
| 2,120,244 | Dryer | June 14, 1938 |
| 2,067,686 | Semon | Jan. 12, 1937 |
| 1,947,219 | Murrill | Feb. 13, 1934 |